United States Patent
Firman

(10) Patent No.: US 9,055,120 B1
(45) Date of Patent: Jun. 9, 2015

(54) DEVICE CAPABILITY FILTERING

(75) Inventor: Ilya Firman, San Mateo, CA (US)

(73) Assignee: Google Inc., Mountain View, CA (US)

(*) Notice: Subject to any disclaimer, the term of this patent is extended or adjusted under 35 U.S.C. 154(b) by 501 days.

(21) Appl. No.: 13/361,241

(22) Filed: Jan. 30, 2012

Related U.S. Application Data

(60) Provisional application No. 61/576,861, filed on Dec. 16, 2011.

(51) Int. Cl.
| | |
|---|---|
| G06F 15/173 | (2006.01) |
| H04L 29/08 | (2006.01) |
| H04W 4/18 | (2009.01) |
| G06F 9/445 | (2006.01) |
| H04L 12/26 | (2006.01) |

(52) U.S. Cl.
 CPC .............. *H04L 67/303* (2013.01); *H04W 4/18* (2013.01); *G06F 8/61* (2013.01); *H04L 43/065* (2013.01)

(58) Field of Classification Search
 CPC ... H04L 67/303; H04L 43/0465; H04W 4/18; G06F 8/61
 See application file for complete search history.

(56) References Cited

U.S. PATENT DOCUMENTS

| | | | | |
|---|---|---|---|---|
| 7,512,401 | B2* | 3/2009 | Muhonen et al. | 455/414.1 |
| 8,266,357 | B2* | 9/2012 | Knowles et al. | 710/240 |
| 8,633,796 | B2* | 1/2014 | Tobita et al. | 340/5.1 |
| 8,725,745 | B2* | 5/2014 | Zargahi et al. | 707/754 |
| 8,731,529 | B2* | 5/2014 | Lindeman et al. | 455/414.1 |
| 8,752,044 | B2* | 6/2014 | Motta et al. | 717/178 |
| 2002/0131404 | A1* | 9/2002 | Mehta et al. | 370/352 |
| 2006/0030303 | A1* | 2/2006 | Albertsson et al. | 455/414.2 |
| 2009/0030792 | A1* | 1/2009 | Khivesara et al. | 705/14 |
| 2012/0117558 | A1* | 5/2012 | Futty et al. | 717/176 |

* cited by examiner

*Primary Examiner* — Thomas Dailey
(74) *Attorney, Agent, or Firm* — Morris & Kamlay LLP

(57) ABSTRACT

A computer-implemented method may include identifying first capability information for a computer device. The first capability information may be provided by the computing device. The method may further include augmenting the first capability information to produce second capability information that reflects capabilities of the computing device that were not reported by the computing device, comparing the second device capability information to application requirements that define device characteristics required or preferred for one or more applications in an online application marketplace that is accessible to the computing device, and providing one or more representations of applications filtered by the comparing of the second device capability information to the device requirements. The one or more representations may be provided for presentation by the computing device.

14 Claims, 10 Drawing Sheets

DEVICE CAPABILITY FILTERING

CROSS-REFERENCE TO RELATED APPLICATION

This application claims priority to U.S. Provisional Application Ser. No. 61/576,861, filed on Dec. 16, 2011, entitled "Device Capability Filtering," the entire contents of which are hereby incorporated by reference.

TECHNICAL FIELD

This document relates to systems and techniques for presenting information about software applications.

BACKGROUND

Software drives computers and, in turn, allows computer users to be more efficient in their work, more effective in their daily lives, and more entertained with games, puzzles, and other software. Software can be sold both in physical forms (e.g., on disks within a box that is sold in a store) or in electronic forms (e.g., via a download from an application store).

With the development of more sophisticated mobile computing devices (e.g., smartphones) has come development of online application stores or marketplaces through which users of such devices can purchase and pay for various applications that they need or otherwise desire. Over time, manufacturers of computing devices introduce more advanced devices, and software developers respond by producing applications that take advantage of the new capabilities of such new devices or new features on the devices (e.g., better image capture tools, better sensor packages, etc.). As a result, certain applications in an application marketplace may be able to operate with the devices of some users who access the marketplace, but not with the devices of other users.

SUMMARY

This document describes systems and techniques that may be used to identify applications that will execute effectively on models or classes of computing devices, and conversely models or classes of devices that will properly execute a particular application or applications. A mobile computing device such as a smartphone may, in normal operation, provide to an application marketplace information that specifies its technical capabilities. However, such information is not always accurate (e.g., a manufacturer may have made an error in the information that describes the device capabilities) or is too general (e.g., the manufacturer may have provided the device with a label for a capability (e.g., "still camera") but that label may end up covering different devices that have different capabilities (e.g., a device with a 12 Megapixel (MP) camera and a device with a 18 MP camera). As a result, the system and techniques described below may be used to augment configuration information that a computing device self-reports, so as to better reflect the actual capabilities of a device. To address such a problem, a system can identify the type of the device (e.g., at the specificity level of the stock-keeping unit (SKU), or at another specificity level, such as make and model) and then can access information that accurately describes the capabilities of that device type. The system can identify the device type, for example, either from a device identification that it submits to a marketplace and/or by looking at the particular capabilities it reports. The system may then refer to a device capability library, and may add capabilities from that library to the capabilities reported by the device, or may replace those reported by the device with capabilities from the device library.

The system may then identify which applications are compatible with the device, or whether a certain pre-identified subset of applications is compatible. This can be done, for example, by comparing the augmented device capability definition to an application requirements definition for each application. Multiple compatible applications can be found simply by cross-filtering the requirements for those applications against the augmented device capabilities definition. Alternatively, the compatibility or non-compatibility of a particular application (as opposed to a group of applications) or applications may be determined by first identifying the relevant application (e.g., if a user goes to a web page for purchasing that application in a marketplace) and then determining whether the requirements of that particular application or applications match the augmented capabilities of the device. For example, a message can be displayed on a web page for an application to indicate that the application will or will not work with a user's device, e.g., "This application is compatible with your Brand X, Model Y phone."

In addition, the techniques discussed here may be used to identify which devices will properly execute a given application, and how important, in terms of application sales volume, capability might be. For example, a prospective publisher or developer of a software application may desire to develop an application that will sell in large volumes (where either of the terms "developer" or "publisher" is used in this document to cover any party with substantial responsibility in the coding, organization, distribution, or sales of a particular application, though such a party is distinct from an application marketplace or similar organization that may carry a large number of applications from a number of different publishers). Such a publisher may log onto an application marketplace and define requirements for the application. In other examples, application requirements may also be set forth in a manifest file embedded in the application.

The marketplace may then display to the publisher a list of devices and groups of devices that are capable of executing the application in its current configuration. The publisher can then change requirements of the application to conduct an "if/then" analysis to quickly understand how adding additional features may lower the potential market for the application, for example. In determining which device types can run the application, the capabilities library discussed above may be cross-referenced by the marketplace system against the application requirements that the publisher has most recently defined.

The data that represents the number of active devices of each type may be kept up-to-date by the application marketplace accessing information about recent activations of devices of particular types. For example, the marketplace may obtain information from a maker of a device operating system that shows numbers of activations by each device type and by date. A "decay" rate may be applied to the activated devices so as to indicate the expiration of such devices. For example, a negative slope may be applied to the devices over time after their activation dates, with jumps at one year from activation and two years from activation, under an assumption that users will slowly get rid of their devices over time (e.g., losing or breaking it) and will deactivate their device voluntarily at the end of a contract cycle. Thus, the reported volume numbers may attempt to approximate the total number of users that might currently access the application marketplace. Additional "shaping" of the demand numbers may also be applied, such as by identifying a higher likely demand for devices activated more recently, under an understanding that people download more applications when they devices are new compared to when they have had a device for a prolonged period of time.

Historical data on the rates of such decay may be used in a model to represent the number of each type of device that is still in use. Alternatively, the number of devices may be computed or inferred from device activity at the marketplace. For example, the number of visits or application downloads for each type of device may be tracked, and each device may then be normalized, such as to a total of 100% of the visits or downloads. Each device or group of devices may then be aggregated, and their percentage of market share with the marketplace can be determined (e.g., for a predetermined most recent period, including with higher weighting for recent visits or downloads as compared to more distant ones). By such shaping, the marketplace may provide an application publisher with a better indication of the likely demand for their application, and with the changes in the demand that will result from changing feature requirements for the application.

The library of device capabilities that a marketplace maintains may be updated in various manners. For example, device manufacturers may register with the marketplace and may report device capabilities for their various devices—where information may be made available to them after they place inaccurately-reporting devices on the market. Alternatively or in addition, administrators of the marketplace may manually update a library, or the system may automatically update the library, such as based on analysis of customer complaints that are correlated to particular applications and to particular device types (e.g., a marketplace or an on-device application that communicates with the marketplace can ask a user of a particular device type that has created problems in the past to perform a number of functions with the device, including running a diagnostic application on the device, and to report back to the marketplace how the device is reacting). Such information may be used to refine a library's definitions of the capabilities of the device or device type.

Such techniques may, in certain implementations, provide one or more advantages. For a user of a device, an accurate portrayal of available applications from an application marketplace may be presented. The user can thus know which applications are compatible or suitable for them based on their device's capabilities, and may avoid wasting time looking at applications that cannot run, or cannot run well, on their device. Such accurate capability information may be provided even where the user's device is reporting inaccurate capabilities. In some implementations, the reporting of inaccurate capabilities by a device may at least be partially mitigated when the application marketplace is configured to receive automated compatibility test results, which provide information on device capabilities before a device is launched into the market, and where such results may be provided by an original equipment manufacturer (OEM) that makes the device.

For a publisher, a system can conveniently provide immediate feedback regarding the effect that adding or removing features from an application will have on the size of the potential market for the application. As a result, an application marketplace can provide superior service to its stakeholders even across multiple different device types and applications.

In one implementation, a computer-implemented method is disclosed. The method comprises identifying, at a computer server system, first capability information for a computer device, the first capability information being provided by the computing device; augmenting the first capability information to produce second capability information that reflects capabilities of the computing device that were not reported by the computing device; comparing the second device capability information to application requirements that define device characteristics required or preferred for one or more applications in an online application marketplace that is accessible to the computing device; and providing, for presentation by the computing device, one or more representations of applications filtered by the comparing of the second device capability information to the device requirements.

In another implementation, a computer-implemented server system is disclosed. The server system includes comprises a server front end arranged to interact with a plurality of computing devices seeking to obtain information about applications in an online application marketplace; a device capability library that stores information that indicates technical capabilities of a plurality of different devices that are programmed to execute applications from the application marketplace, wherein some of the devices are not capable of properly executing some of the applications; and a marketplace manager programmed to produce a filtered group of one or more applications that are compatible with a particular computing device, by augmenting device capability information received from the particular computing device with device capability from the library that corresponds to, but is different than, the device capability data received from the particular computing device.

In still another implementation, a computer-implemented method is disclosed. The method comprises receiving, at a computer server system and from a remote computing device, an application requirement definition for a computer application to be made available at an online marketplace; comparing the application requirement definition to device capability information for a plurality of different computing devices stored in a library of the computer server system; and identifying quantities of computing devices whose corresponding device capability information indicates an ability of the devices to properly execute the applications according to the application requirement definition.

The details of one or more embodiments are set forth in the accompanying drawings and the description below. Other features and advantages will be apparent from the description and drawings, and from the claims.

DESCRIPTION OF THE DRAWINGS

Like reference symbols in the various drawings indicate like elements.

DETAILED DESCRIPTION

This document describes systems and techniques for tracking compatibilities between applications in an online application marketplace, on the one hand, and devices or device types (i.e., devices that share common features) that access and download applications from the marketplace, on the other hand. In certain examples, the marketplace may maintain a library of device capabilities for all of the major device types that run a particular operating system that is served by the marketplace. The library can be used to replace or otherwise augment information that is received from each device that at least partially identifies capabilities of a device. For example, a device may provide to a marketplace system a device identifier, and such an identifier may be mapped to capabilities of that device type in a library, with the identified capabilities then being matched to requirements of various applications that are available for download from the application marketplace.

Alternatively or in addition, the device may transmit information that explicitly identifies particular capabilities of the device, such as a list of parameters, where each parameter defines, by its terms, a particular feature or features of the device (e.g., where it has a multi-core processor, a camera, a video camera, GPS capability, a telephone, and the like). A marketplace system may identify differences between such data received from the device and parameters that have been identified as "override" parameters in the library because they have been explicitly identified as trumping whatever parameter that type of device reports (e.g., because it has been determined that the devices were wrongly programmed to report inaccurate data about their capabilities). Again, such augmented data about the device capabilities can then be used to filter a list of applications that are available to the device, or to indicate whether particular applications are compatible with the device.

In other implementations, software publishers can provide a list of parameters for their applications, and the system may provide an indication of the types of sales volumes of devices that can execute the applications. For example, a particular publisher can select from a hierarchical list of features to which his or her application must have access, and each time the publisher changes a parameter for a feature, a display may be updated that shows a list of all device types or groups of device types that can execute the application under its current definition, or a market size of the devices that can do so (e.g., by indicating that the application, as currently configured by the publisher with the system, can run on 755 of all 2000 device types that operate the particular operating system that is associated with the marketplace).

Figure 1:
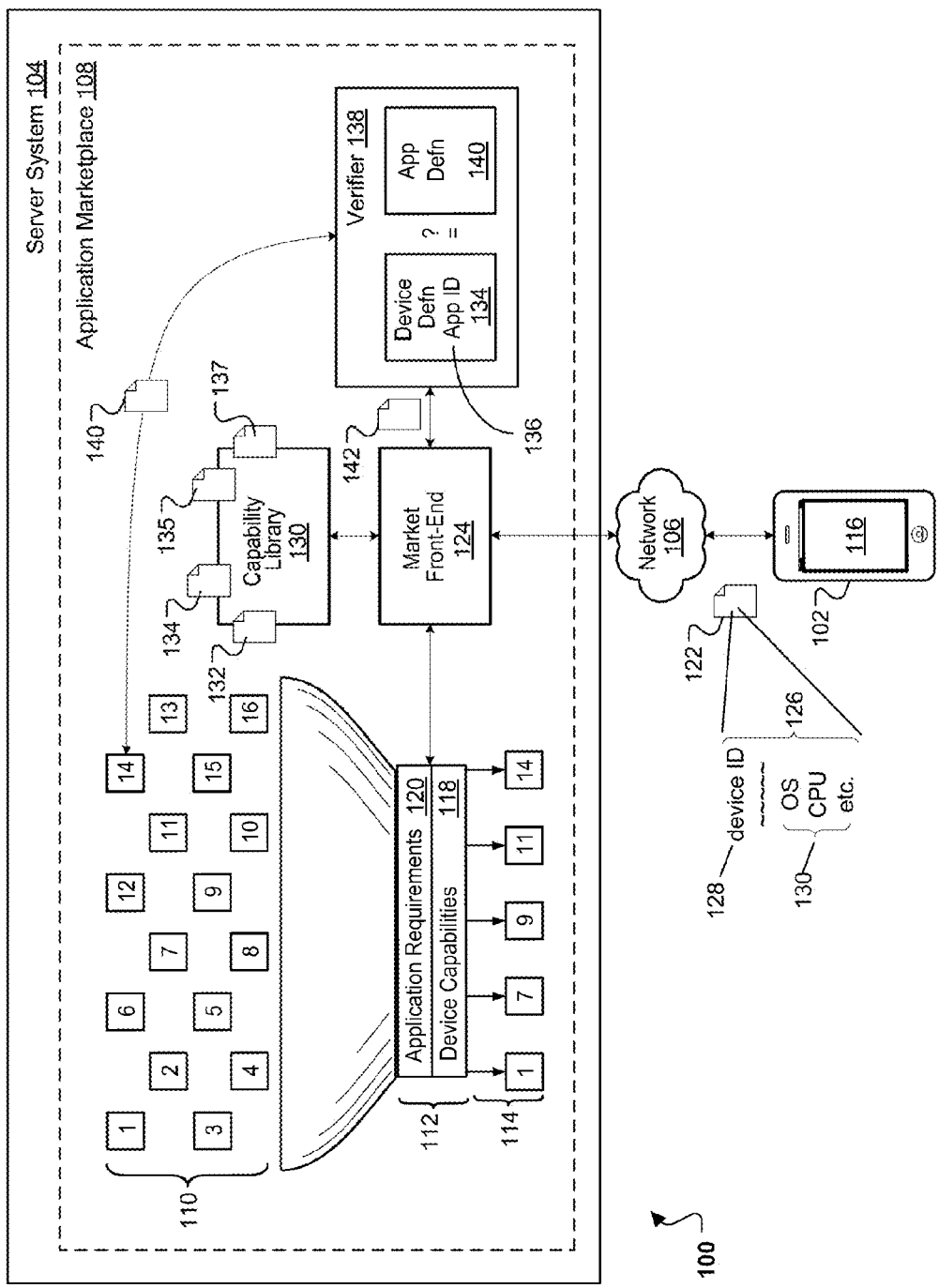
FIG. 1 shows a conceptual diagram of a system for identifying compatibility between software applications and devices for executing the applications.

Referring now to FIG. 1, a conceptual diagram of a system 100 for identifying compatibility between software applications and computing devices for executing the software applications is shown. In this example, the system 100 includes a mobile device 102 and a server device 104 (which would typically be implemented as a large number of different servers in a system that may perform a variety of tasks using virtualization and related technologies) communicatively connected by a network 106 (e.g., the Internet). The server device 104 implements an application marketplace 108. In general, the marketplace 108 is an online software store that allows users to, among other things, browse and download mobile applications to computing devices that are compatible with such applications and capable of effectively executing them.

In a first example scenario, a user is browsing for applications in the marketplace and wants to see all applications that will run on the user's device (though perhaps with some topical filtering such as all "sports" applications, all "new" applications, all free applications, the top-rated or most-popular applications, and the like). In a second example scenario, the user selects a particular application (perhaps by searching on its title and being shown the application's informational web page on the marketplace), and the system indicates whether or not the application will likely run properly on the user's device.

Example Scenario A

Referring now more particularly to the first scenario involving browsing and display of multiple compatible applications, a plurality of mobile applications 110 that are generally managed by the marketplace 108 may be subjected to a filter 112 so as to create a subset 114 of the mobile applications 110. The subset 114 may include only those applications of the mobile applications 110 that are evaluated as potentially compatible with the mobile device 102. The mobile applications within the subset 114 may then subsequently be exposed to a user when the user accesses the marketplace 108 via a web or client interface 116 on the mobile device 102. In this manner, those applications of the mobile applications 110 that are possibly incompatible with the mobile device 102 are concealed from the user. Such an implementation can be beneficial in many respects. For example, a situation may be avoided in which a user inadvertently downloads a mobile application that is incompatible with the user's device.

The filter 112 generally implements a selection mechanism that may be based upon a set of device capabilities 118 and application requirements 120. The device capabilities 118 may represent the actual technical capabilities and/or configuration of devices such as the mobile device 102. In general, such features may correspond to the hardware and software aspects of the mobile device 102. In contrast, the application requirements 120 define certain hardware and software resources required or otherwise recommended for a particular application, of the mobile applications 110, to execute properly on the mobile device 102 or other devices that may download applications from the marketplace 108. When the application requirements 120 of a particular application of the mobile applications 110 match with the device capabilities 118 of the mobile device 102, the filter 104 passes that particular mobile application (e.g., those applications labeled 1, 7, 9, 11, and 14 in FIG. 1). For example, if a particular device supports twenty (20) features and a given application requires two (2) of those features, the filter 104 may pass that application provided that the two features are among the twenty. The filter 104 otherwise rejects the particular application, and ultimately prevents that particular application from being exposed to a user when the user browses the marketplace 108 (e.g., those applications labeled 2, 3, 4, 5, 6, 8, 10, 12, 13, 15, and 16 in FIG. 1).

In one example implementation, the device capabilities 118 of the mobile device 102 may be determined either prior to or in concurrence with the interface 116 requesting access to the marketplace 108. For example, the mobile device 102 may periodically or at least intermittently upload a configuration report 122 to a market frontend 124 that is implemented by the server device 104. The configuration report 122 may include a plurality of parameters 126 that define the hardware and software characteristics of the mobile device 102. An example parameter may include a device type ID 128 that identifies a type and/or a version of the mobile device 102 (e.g., "device ID=Brand X, Model Y). Other example parameters may include device specifications 130 that identify particular features and/or characteristics of the mobile device 102 such as, for example, operating system type (e.g., "OS=4.0"), CPU type (e.g., "CPU=1 GHz; Brand X, Model Y"), and others.

In one example, a "device type" may generally represent a group of particular device models that share all relevant operational parameters. An identifier that represents "device type" may include, for example, a device model identifier, a stock-keeping unit number, a software framework version number, and/or a build identification number, or any other appropriate identifier that identifies a group of devices that have essentially the same characteristics.

Upon receipt of the configuration report 122, the frontend 124 may access a capability library 131 to vet the parameters 126 as defined within the configuration report 122. For example, the frontend 124 may compare the parameters 126 to one or more parameters stored in the capability library 131 and associated with the mobile device 102. For example, the frontend 124 may use the device ID 128 as specified in the configuration report 122 to access a device-specific configuration file (DCF) 132 that is located within the capability library 131. The DCF 132 may include accurate and up-to-date definitions as to the actual capabilities of the mobile device 102, such as capabilities verified by the device manufacturer, the marketplace operator, or a trusted third party. In general, the DCF 132 may be defined within the capability library 131 by a publisher or developer, as described in further detail below in connection with FIG. 2. In the absence of configuration information within the configuration report 122, the frontend 124 may access a baseline profile 135 within the capability library 131 that includes requisite configuration information used to determine device/mobile application compatibility. The capability library 131 may further include an override profile 137 that may be used to augment configuration information (e.g., device specifications 130) uploaded by the device 102 in certain situations.

The frontend 124 may augment the configuration report 122 based on the DCF 132 following receipt of the configuration report 122. Augmentation as defined within the context of the present disclosure may, for example, include:
(a) replacement of all information submitted by the device 102 with information from the DCF 132;
(b) addition of one or more parameters to the configuration report 122;
(c) removal of one or more parameters from the configuration report 122; and/or
(d) modification of one or more parameters of the configuration report 122.

For example, the frontend 124 may add a particular parameter to the configuration report 122 when that parameter has been inadvertently omitted from the configuration report 122. For example, the frontend 124 may append the parameter "camera=1.3 MP, fixed focus, front-facing" to the configuration report 122 if and when the "camera" parameter has been omitted, or when one or more specifics of the camera capability has been omitted. Omission of a parameter may occur for example when an original equipment manufacturer (OEM) fails to populate this parameter within the configuration report 122 prior to shipment of the mobile device 102. Another example relating to omission of a parameter is when a future framework version introduces a new feature label for something that was previously required, and now it needs to be assumed for all devices running an older version of the framework. In this example, the configuration report may require modification to support the natural evolution of the platform.

As another example, the frontend 124 may remove a parameter from the configuration report 122, where the parameter incorrectly specifies that the mobile device 102 includes or otherwise exhibits a particular capability, when in fact the mobile device 102 does not include that capability. For example, the frontend 124 may remove the above-mentioned "camera" parameter from the configuration report 122 if and when that parameter has been incorrectly populated in the configuration report 122. A misreported parameter may stem from, for example, an incorrect configuration file (e.g., a versioning issue) being uploaded to a particular mobile device before the device is shipped.

As another example, the frontend 108 may modify a parameter within the configuration report 122 to more accurately specify the true capabilities of the mobile device 102. For example, the frontend 124 may amend an operating system-related parameter "OS=Platform A Version 1" to a modified definition including "Platform A Version 2," to better reflect the configuration of the mobile device 102. In general, the second version of the platform may be compatible with other versions of the platform (e.g., "Version 1"). In the present example, the filter 104 would potentially pass a greater number of the mobile applications 100 as being compatible with the mobile device 102.

Following revision or verification of the parameters 126 as defined within the configuration report 122, the frontend 125 may generate an augmented file 134. The augmented file 134 may reflect any relevant changes (i.e., addition, removal, and/or modification) to the configuration report 122. The augmented file 134 may then be incorporated within the device capabilities 118 such that the filter 112 may select only those applications of the mobile applications 110 that are potentially compatible with the mobile device 102. Such an implementation may, as described above, at least prevent a situation where a user inadvertently downloads a mobile application that is incompatible or otherwise inconsistent with the true capabilities of the user's device.

Example Scenario B

In a second example scenario, a system may determine whether a particular single application of the mobile applications 110, as directly selected by the user, is compatible with the mobile device 102. For example, the user may access the marketplace 108 via the interface 116 on the mobile device 102 to browse through the mobile applications 110. In practice, the user may navigate to a web page (not shown) that features a particular one of the mobile applications 110. For example, a web page may be accessed that provides a brief description that includes user reviews, screenshots, pricing information, rating information, number(s) of install information, and other information related to mobile application "14" as shown in FIG. 1. Upon access of a particular web page, the frontend 124 may access the capability library 131 to vet the parameters 126 within the configuration report 122 using application-specific definitions within the capability library 131 in a manner similar to that described above. However, in this example, the augmented file 134 may optionally be populated with an app ID 136 that identifies the particular application of interest (e.g., mobile application "14").

The augmented file 134 may then be transferred to a verifier 138 that compares the actual technical capabilities of the mobile device 102 as defined within the augmented file 134 to the application requirements of the particular application that corresponds to the app ID 136. For example, the verifier 138 may access an application-specific configuration file (ACF) 140 and compare the augmented file 134 with the ACF 140. An indication 142 may then be returned to the interface 116 that informs the user whether the particular application that corresponds to the app ID 136 is compatible or incompatible with the mobile device 102. Such a decision may be based upon whether or not the application requirements of the application associated with the app ID 136 corresponds with the actual capabilities of the mobile device 102, as specified within the augmented file 134.

In some examples, the indication 142 provides details that relate to the capabilities of the mobile device 102 and system requirements of the particular application that is associated with the app ID 136. For example, the indication 142 file may list at least a portion of the actual capabilities of the mobile device 102 and/or at least a portion of the application requirements of the application that corresponds to the app ID 136. In this manner, the user may be informed as to whether the subject application is possibly incompatible with the mobile device 102, and/or to the configuration details related to the subject application and the mobile device 102.

Obtaining Baseline Profiles

As mentioned above, the frontend 124 may access a baseline profile 135 within the capability library 131 that includes requisite configuration information used to determine device/mobile application compatibility. In one example, baseline profiles are entered into a database by a batch process that combines device capabilities gathered during a device certification testing process (e.g., as performed by an OEM) with the device capabilities extracted from uploaded configuration data (e.g., configuration report 122). In general, the device capabilities gathered during a device certification testing process should match with the device capabilities extracted from uploaded configuration data. However, when a discrepancy is discovered between the two different sets of device capability information, the issue may be resolved by investigating the discrepancy with the relevant OEM. An example implementation of such a process may include the following steps (a)-(h). However, not all of the following example steps (a)-(h) are necessary or required for the purpose of surfacing identifying certain ones of the mobile applications 108 that are potentially compatible with a particular mobile device (e.g., mobile device 102).

At a step (a), a list of profiles "A" may be generated from device configurations exported from a certification test result database. In one example, the device configurations correspond to the hardware and software characteristics of a particular mobile device such as, for example, a smartphone device reported to include, among other things, 8 Megabytes (MB) of memory. Particular device types may be identified by SKUs, model names, group identifiers provided by OEMs, or by other mechanisms. A device type is an identifier for devices that have the same specifications that are relevant for purposes of executing applications on the devices. Thus, for example, devices having different amounts of memory or different screen sizes may be assigned different device types, while different models that have cosmetic differences or small differences that do not affect operation of application (e.g., certain buttons are placed in slightly different locations on the devices) may be assigned to the same device type.

At a step (b), a list "B" may be generated to include respective device configuration information (e.g., make, model, internal device model identifier (ID), software framework version, etc.) for all devices registered with the application marketplace 108. This list may represent configuration information that is provided, but for a particular model or device type by a manufacturer, but by various devices in-the-field that belong to end users who access the marketplace, and whose devices report their configuration information when they do so. This real-world configuration information may differ from the configuration information that manufacturers provided for the matching devices types, e.g., because the manufacturer provided inaccurate data, because the configuration of a device change after the manufacturer specified is capabilities but before it shipped, because the capabilities of a device were changed after it started shipping, or because certain users have modified their devices (e.g., by adding additional memory to them).

At a step (c), a list of profiles "C" may be generated by grouping configurations in the list B by common configuration information, such as internal device model ID and software framework version. In this example, the grouping may be performed by identifying a "typical" configuration for each model and version and, when there are multiple configurations available for the device/framework pair, a more prevalent configuration may be selected. Such grouping may reduce the incidence of duplicate device types by being provided with a list of device capabilities that are relevant to the software filtering function, and grouping all devices that have common parameters for those capabilities so as to create a smaller number of different device types for the system. The step may be unnecessary where the system is arranged simply to use the device types identified by particular manufacturers, and not to group devices or device types into larger groups of device types.

At a step (d), each profile in the list "A" may be added to a result device library "D." In this example, the result device library "D" may generally be exported to the application marketplace for use by resources of the application marketplace 108 (e.g., a publisher site that software publishers may use when providing their applications to the marketplace, marketplace servers that present applications for review by customers), as described in further detail below. Thus, the device library "D" serves as the resource against which the marketplace matches applications selections when determining which applications to present to users who are requesting applications.

At a step (e), a discrepancy list "E" may be generated by comparing each profile in the list "A" with a profile for the same model/version in the list of profiles "C." Again, the information in list "A" represents configuration information provided by manufacturers (OEMs), while the information in list C represents configuration information for devices in-the-field, as reported when users of those devices interact with the marketplace. Differences between configuration information contained within the list of profiles "A" and corresponding configuration information contained within the list of profiles "C" is populated within the discrepancy list "E." More specifically, features for a device that have been provided by a manufacturer of the model of the device (e.g., as reflected in list of profiles "A") may be compared to features of an actual device that has that model number (e.g., as reflected in list of profiles "C") to determine whether manufacturer-reported features are consistent with field-reported differences. For example, a manufacturer may have reported that a particular model of smartphone has 8 MB of memory, but may have increased the amount of memory to 16 MB after setting an initial specification (and reporting that specification to the application marketplace 108) prior to shipping the smartphone. Also, certain users may have upgraded to 32 MB of memory. Thus, the list of profiles "A" may show a value of 8 MB, while the list of profiles "C" may show mainly values of 16 MB, with a few values of 32 MB. As described below, the process may notify OEMs or other appropriate parties of discrepancies that have been found by the marketplace's operation so that they may deal with the discrepancies accordingly.

In a step (f), each profile in the list of profiles "C" may be appended to the result device library "D" when a particular profile in the list of profiles "C" is absent in the list of profiles "A," and more than a predetermined number "X" devices are reporting the particular profile (i.e., device configuration information). In this example, the particular profile may also be populated within the discrepancy list "E." For example, a manufacturer may not have reported capabilities for a particular device, but users of the device may begin accessing the marketplace and requesting to see applications that can run on their devices. The marketplace may initially have no entry in its library for such devices, but after a number X of devices report their capabilities, the process may determine that there is a real and substantial population of such devices and may add them to the library as their own device type.

In a step (g), the result device library "D" may generally be exported to the application marketplace for use by resources of the application marketplace 108 (e.g., publisher site, marketplace servers as described above). In the example system discussed with respect to FIG. 1, the result device library "D" may correspond to the baseline profile 135, where the baseline profile 135 may be used to determine device/mobile application compatibility in the absence of configuration information within the configuration report 122.

In a step (h), the list of discrepancies "E" may be formatted and transferred to an appropriate e-mail alias such that an authorized individual may follow-up with an OEM(s), or may otherwise be communicated to a responsible party. As a result of the follow-up, the baseline profile may be augmented with an override profile and/or the OEM might be compelled to modify their firmware and issue an update. If a device is present in the field but is missing in the certification database, it might be running software associated with the application marketplace 108 without authorization, and legal action might be taken. For example, a representative of an OEM may determine that its devices are improperly reporting their capabilities, and may update their firmware to correct the problem. The representative may also determine that the company initially erred in reporting the device capabilities, and the communication here may cause the representative to update the manufacturer's definition for the device or device type. As yet another alternative, the representative may be alerted that a certain number of users are modifying their devices in a particular way, such as by increasing their memory. The manufacturer could use such information to determine that it ought to ship "stock" devices with more memory, or to promote a memory upgrade program among its users. In each such instance, the information provided to the manufacturer may be grouped, and no personally identifiable information may be passed.

Figure 2:
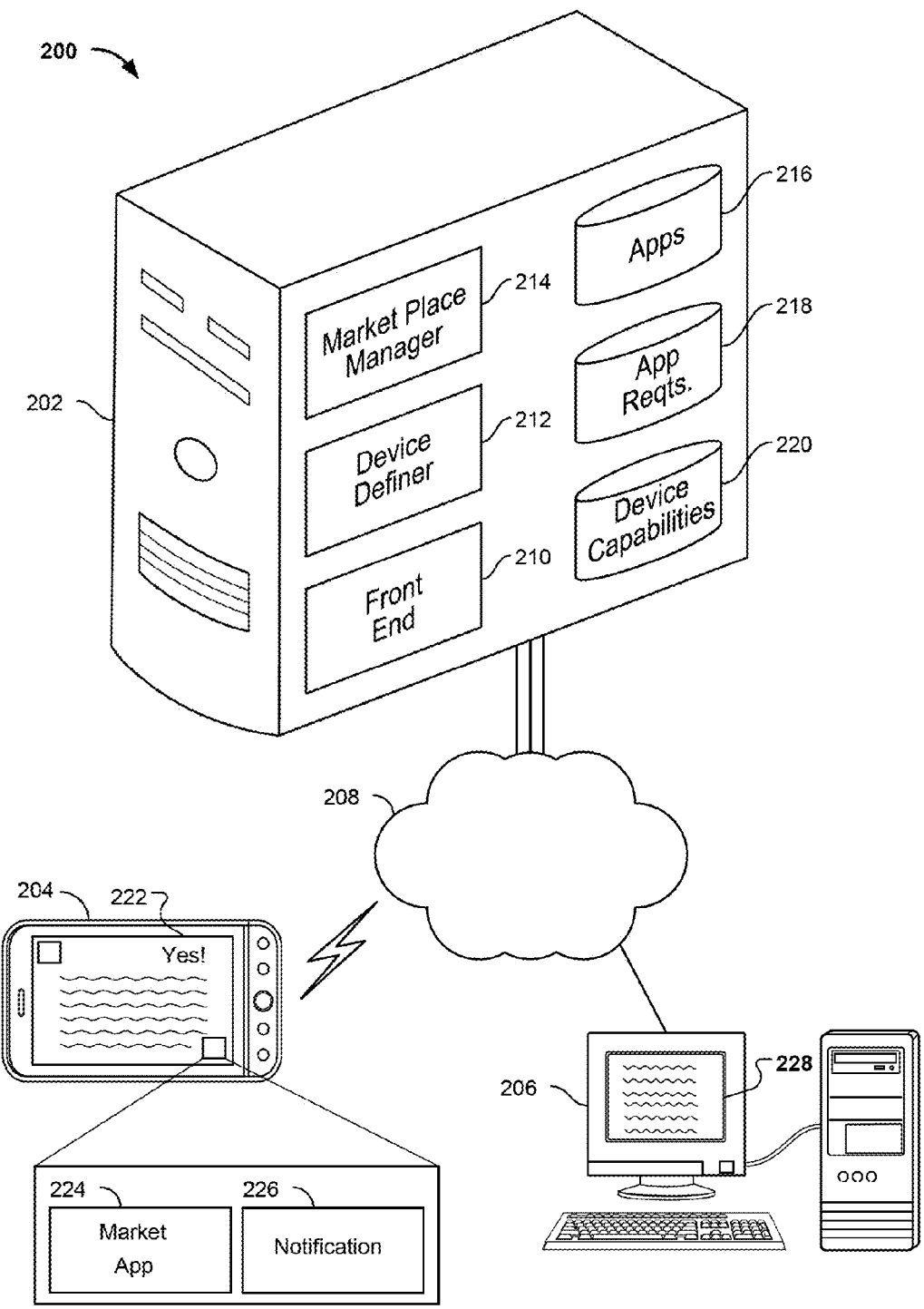
FIG. 2 shows a block diagram of an illustrative software application marketplace system.

Referring now to FIG. 2, a block diagram of an illustrative software application marketplace system 200 is shown. In general, the system 200 uses a server system 202 to communicate with both publishers and consumers regarding the technical demands of software applications. The server system 202 receives information from devices of consumers, where the information may inadequately describe those capabilities, it augments such information to make it more accurate, and then it checks the capabilities of particular devices against demands of particular applications to determine which applications can execute successfully on which devices. From publishers, it accepts application requirement definitions and indicates to the publishers the relative number of available customers they can expect for any change in the definitions, so that publishers can adjust what their applications require of the system in balance of the scope of market the publishers want to reach—i.e., more requirements may mean a smaller market, and the system may indicate how much smaller. The system 200 may implement the techniques discussed above with respect to FIG. 1 and below with respect to FIGS. 3A and 3B.

Referring now more specifically to particular structural components of the system 200, a network 208 is a bi-directional data communication path such as, for example, any of a number of wireless or hardwired WAN, LAN, Internet, or other packet-based communication networks such that data can be transferred among the elements of the system 200.

The server device 202 is one or more (up to many thousands) computing devices that collectively implement a front end 210, a device definer 212, a marketplace manager 214, an application datastore 216, an application requirements datastore 218, and a device capabilities datastore 220. As described in further detail below, the respective components of the server device 202 are at least configured to implement:

(a) an application marketplace that allows users to browse and download mobile applications to compatibly configured computing devices;

(b) an algorithm for identifying compatibility between mobile applications associated with the application marketplace and computing devices for executing the applications; and (c) functionality that permits a publisher or developer to interact with the application marketplace to define requirements for a particular mobile application, as well as obtain information about the marketability of a particular mobile application.

The mobile device 204 and the publisher device 206 are client computing devices that may be used by a consumer and a publisher, respectively, to interact with the server system 202 via the front end 210. Examples of a client computing device include smartphones, cellular telephones, personal computers, laptop computers, tablet computers, e-book readers, gaming consoles, music players, or any other appropriate type of special purpose computing device. In general, the mobile device 204 and the publisher device 206 may be leveraged by a user to interact with each other, as well as functionality as implemented by the server device 202.

For example, the mobile device 204 may implement a market client 222 in the form of a native application that permits a user to browse and download one or more of a plurality of mobile applications (not shown) that are stored within the application datastore 216 of the server device 202. For example, the market client 222 may communicate and interact with the front end 210 and/or marketplace manager 214 of the server device 202 via the network 208 to access a web page 224 that surfaces a mobile application to the user. In general, this interaction may occur in a number of ways, sometimes referred to as a "use case." Examples of a "use case" may correspond to:

(a) browsing on a device;

(b) browsing on the Web, user is signed in; and (c) browsing on the Web anonymously.

With respect to example "use case" (a), a native marketplace client may interact with an API server, and the server may know the capabilities of a particular device exactly (e.g., because they have been uploaded and the device identifies itself with a unique ID). Applications incompatible with the particular device are hidden from the user. In this example, an uploaded configuration file may be augmented with by library overrides, as described in further detail below.

With respect to example "use case" (b), a user may or may not be on the device where the install is requested. For example, a user may have multiple devices associated with that particular user's account. In this case, the server may not hide applications (e.g., because an application may be incompatible with device A, but compatible with device B). However, when the user attempts an install, the server may display compatibility information for each device associated with the user's account, and only allow the install on compatible devices (e.g., a user may request an application be "pushed" to a particular device). In this example as well, an uploaded configuration file may be augmented with by library overrides.

With respect to example "use case" (c), a user may be shown a sample of popular devices on which a particular application will work or show a "check device" tool where the user can enter a device name and we tell her if the device is compatible. In general, this may be performed without any knowledge of or about the user. In this example, a "baseline" profile (e.g., baseline profile 135) from a device library may be used.

In one specific example scenario, the mobile application may be exposed to the user in a manner consistent with the Example Scenario A as described above. For example, the front end 210 may consult the application requirements datastore 218 and device capabilities datastore 220 of the server device 202 and ultimately determine, by way of a selection mechanism as implemented by a filter or filters, that the mobile application is compatible with the mobile device 204. The user may then optionally download the mobile application to the mobile device 204 as desired.

In another specific example scenario, the mobile application may be exposed to the user in a manner consistent with Example Scenario B as described above. For example, the marketplace manager 214 may access the application requirements datastore 218 and device capabilities datastore 220, resolve whether or not the mobile application is compatible with the mobile device 204, and return a notification 226 that optionally includes details as to the compatibility or incompatibly between the mobile application and the mobile device 204. A notification 226 may further optionally include details related to the capabilities of the mobile device 204 and system requirements of the mobile application 224.

As mentioned above, the publisher device 206 too may be employed by a user to interact with functionality as implemented by the server device 202.

For example, the publisher device 206 may include a publisher client 228 that permits a developer/publisher to log-on and access functionality as implemented by the server device 202 via the front end 210. For example, the publisher client 228 may enable a publisher to define requirements for mobile applications (e.g., application requirements 120), as well as obtain information, about the marketability of mobile applications. In one example, credentials as supplied by the publisher may be used by the front end 210 to identify the publisher as a type of user permitted to submit and manage mobile applications, rather than a conventional user who would otherwise use the market client 222 to browse and download one or more of the plurality of mobile applications within the application datastore 216 for example.

After the publisher's credentials have been authorized, the front end 210 may consult the device capabilities datastore 220 to display, via the publisher client 228, a listing of devices and/or groups of devices associated with the publisher's credentials that are capable of executing a particular mobile application in its current configuration. In one example, the publisher can then modify application requirements of the particular application via the device definer 212.

The publisher may additionally conduct a conditional analysis (e.g., "if/then") that may be implemented to understand the implications related to how modifying the application requirements of a particular application may impact the marketability of the application. For example, removing an otherwise optional application requirement may actually potentially increases sales a particular mobile application by virtue of increasing the number of types and/or versions of mobile devices that are compatible with the optional application requirement. Such removal may be achieved by the publisher via clicking to remove a check mark from a box on user interface for the publisher interface.

Additionally, the device capabilities datastore 220 may be cross-referenced against currently-defined application requirements for the purpose of determining which device types (e.g., "device type ID=Brand X, Model Y") are appropriately configured to execute a particular application. Such an implementation may beneficially provide a developer or publisher with additional information that may drive business decisions related to, among other things, the size and potential of an untapped market.

In one example, the publisher client 228 may further be used to access data that represents the number of active devices of each type (e.g., "active device type ID=Brand X, Model Y; 1 Million") and may be kept up-to-date by the marketplace manager 214 for accessing information that reflects recent activations of devices of particular types. For example, the marketplace manager 214 may obtain information directly from an operating system that shows numbers of activations by each device type and by date (e.g., "OS=Platform A Version 1; 1 Million activations; DATE").

In another example, the publisher client 228 may be used to apply and/or observe one or more trends associated with one or more activated devices. For example, certain trend information may be used to model user-behavior related to device deactivation and activation, again potentially providing a developer or publisher with additional information that my drive business decisions. For example, the publisher client 228 may be used to estimate, via inference or algorithm, the number of each type of device currently in use such as by comparison against application download activity.

Figure 3A:
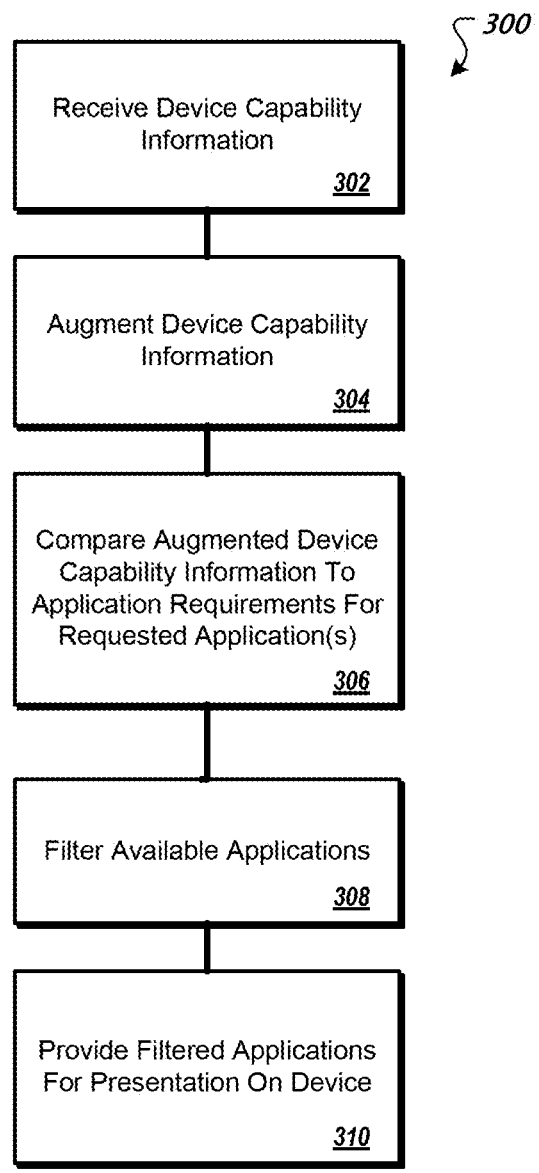
FIGS. 3A and 3B show flow charts of example processes for managing user interactions with applications in an application marketplace.

Referring now to FIG. 3A, an example process 300 is shown by which a device (e.g., mobile device 102 and mobile device 204) provides information that indicates technical capabilities of the device. The technical capabilities may subsequently be augmented by a server system and cross-referenced with one or more mobile applications that may be of-interest to a device user. In some implementations, the process 300 may be performed by the software application marketplace system 200 of FIG. 2.

At step 302, a configuration file that includes device capability information that identifies hardware and software capabilities of a mobile device is received over a network by one or more servers associated with an application marketplace. In some implementations, the configuration file includes a plurality of parameters such as, for example, a device identification parameter that uniquely identifies a type of the mobile device, as well as one or more parameters that specify features and/or characteristics of the mobile device.

In some implementations, the device identification parameter may be used in a look-up table that specifies device name, framework version, and build fingerprint associated with the mobile device. An example table may take the form:
Table A
device_name: AAA
framework_version: 7
build_fingerprint: OEM/AAA/AAA/AAA:2.1 update1/ECLAIR/UVKA2:user/release-keys In some implementations, an example configuration file that illustrates a plurality of example parameters may take the form:
Configuration File A
device_configuration: {
touch_screen: FINGER keyboard: NOKEYS
navigation: NONAV
screen_layout: NORMAL
has_hard_keyboard: false
has_five_way_navigation: false
screen_density: 240
gl_es_version: 131072
system_shared_library:
[android.testrunner; seccamera; javax.obex; com.google.android.maps; sechardware; sec_feature]
system_available_feature:
[android.hardware.camera; android.hardware.camera.autofocus; android.software.live_wallpaper; android.hardware.sensor.light; android.hardware.sensor.proximity; android.hardware.telephony; android.hardware.telephony.gsm; android.hardware.touchscreen.multitouch; android.hardware.location.network; android.hardware.wifi; android.hardware.location; android.hardware.sensor.compass; android.hardware.bluetooth; android.hardware.touchscreen.multitouch.distinct; android.hardware.microphone; android.hardware.location.gps; android.hardware.sensor.accelerometer; android.hardware.touchscreen]
native_platform: [armeabi-v7a; armeabi]
gl_extension:
[GL_EXT_discard_framebuffer; GL_EXT_multi_draw_arrays;
GL_EXT_texture_format_BGRA8888", . . . ]}

In this example, the Configuration File A specifies a portion of physical and software-related characteristics such as features that relate to display size and operating system version (e.g., "touch_screen: FINGER" and "native_platform: [armeabi-v7a; armeabi]").

In practice, the Configuration File A may however itemize each and every device characteristic or technical feature of the mobile device such as, for example, memory size, processor power, sensor availability, keyboard availability, camera availability, camera resolution, and many others such as for example screen density, graphics library version, native platform, supported graphics texture compression formats, and availability of various items such as touchscreen availability, multi-touch touchscreen availability, WiFi availability, Bluetooth availability, autofocus in camera availability flash in camera availability, front-facing camera availability, location services availability, global positioning system (GPS) location services availability, network location services availability, microphone availability, near field communication (NFC) availability, accelerometer availability, barometer availability, compass availability, gyroscope availability, light sensor availability, proximity sensor availability, universal serial bus (USB) availability, and many others.

In general, the particular features that need to be tracked will depend on the comparisons that a system has to make between devices and applications in a particular implementation.

At step 304, a portion of the device capability information as specified within configuration file, as received at step 302, is augmented by the one or more servers. In general, augmentation may include adding, removing, or otherwise modifying one or more of the parameters as defined within the configuration file. For example, adding a parameter to the configuration file may be necessary when a given parameter has been inadvertently omitted by an OEM when the mobile device was shipped following manufacture.

In some implementations, an override profile is accessed at the one or more servers to determine whether any of the parameters, or combination of the parameters, as specified in the table and/or configuration file illustrated at step 304 should be augmented. In general, an override possibility may exist for any of one or more of a plurality of possibilities.

For example, it may be beneficial to determine whether there are any overrides for each of the following possibilities:
Override Information
device_name;
device_name+framework_version;
framework_version;
device_name+framework_version+build_fingerprint.

In this example, two applicable overrides may exist, these may take the form:
Override A
product_name: AAA
framework_version: 7
build_fingerprint: " "
device_configuration: {max_apk_download_size_mb: 30}

In Override A, the override indicates that as of "framework version 7," the device AAA does not support downloads larger than 30 MB.
Override B
product_name: " "
framework_version: 7
build_fingerprint: " "
device_configuration: {
system_available_feature:
[android.hardware.camera; android.hardware.location; android.hardwrare.location.network; android.hardware.location.gps; android.hardware.sensor.compass; android.hardware.sensor.accelerometer; android.hardware.touchscreen; android.hardware.microphone; android.hardware.telephony; android.hardware.bluetooth; android.hardware.camera.autofocus; android.hardware.screen.landscape; android.hardware.screen.portrait]}

In Override B, the override indicates that all devices configured to exhibit "framework version 7" are assumed to support certain features that were made optional in subsequent versions, even if those devices do not report those features. For example, all devices configured to exhibit "framework version 7" are assumed to support the features including, among others, "android.hardware.screen.landscape" and "android.hardware.screen.portrait."

An augmented file, including augmented device information generated based upon information specified in the above-mentioned Table A, Configuration File A, Override Information, Override A, and Override B may take the form:
Augmented File A
device_configuration: {
touch_screen: FINGER
keyboard: NOKEYS
navigation: NONAV
screen_layout: NORMAL
has_hard_keyboard: false
has_five_way_navigation: false
screen_density: 240
gl_es_version: 131072
system_shared_library:
[android.testrunner; seccamera; javax.obex; com.google.android.maps; sechardware; sec_feature]
system_available_feature:
[android.hardware.camera; android.hardware.camera.autofocus; android.software.live_wallpaper; android.hardware.sensor.light; android.hardware.sensor.proximity; android.hardware.telephony; android.hardware.telephony.gsm; android.hardware.touchscreen.multitouch; android.hardware.location.network; android.hardware.wifi; android.hardware.location; android.hardware.sensor.compass; android.hardware.bluetooth; android.hardware.touchscreen.multitouch.distinct; android.hardware.microphone; android.hardware.location.gps; android.hardware.sensor.accelerometer; android.hardware.touchscreen; android.hardware.screen.landscape; android.hardware.screen.portrait]
    native_platform: [armeabi-v7a; armeabi]
    gl_extension:
[GL_EXT_discard_framebuffer;GL_EXT_multi_draw_arrays; GL_EXT_texture_format_BGRA8888; GL_IMG_program_binary; . . . ]
    max_apk_download_size_mb: 30}

In this example, the Augmented File A is generally a modified version Configuration File A, and illustrates that a plurality of features have been added to the Configuration File A including:

(a) android.hardware.screen.landscape;
    (b) android.hardware.screen.portrait; and
    (c) max_apk_download_size_mb: 30.

In this example, a first example mobile application that requires landscape screen orientation support will be allowed to be installed on the mobile device associated with the configuration file received at step 302, while a second example application that is larger than 30 MB will not be allowed to be installed on the mobile device (e.g., the first example application may ultimately be passed and by the filter 114 of FIG. 1, and the second example application may be ultimately be rejected by the filter 114).

At step 306, the augmented device information is compared against one or more mobile application requirements as maintained by the one or more servers. In general, a particular mobile application requirement is associated with a corresponding one mobile application. In one implementation, the mobile application(s) is a specific requested application such as when, for example, a user accesses the application marketplace using the mobile device and selects a particular application of interest, as described above in connection with FIG. 1 and Example Scenario B. In another implementation, the mobile application(s) is not directly requested, and instead is one or many mobile applications generally managed by the online marketplace, such as described above in connection with FIG. 1 and Example Scenario A.

At step 308, a selection mechanism is implemented based on the comparison as at step 306. For example, a filter may be used to select certain mobile applications based upon augmented device information associated with the mobile device and application requirements associated with particular mobile applications. In general, the device capabilities represent the actual technical capabilities of the mobile device, whereas the application requirements define certain hardware and software resources required or otherwise recommended for a particular application of the mobile applications to execute properly on the mobile device.

At step 310, those mobile applications passed by the selection mechanism at step 308 are transferred from the one or more servers associated with the application marketplace to the mobile device. In this manner, when the application requirements of a particular application are matched to the device capabilities of the mobile device, that particular mobile application may be ultimately provided to the mobile device. In another example, those mobile applications that are not passed by the selection mechanism, are provided to the mobile device as part of an indication to inform the user as to why a particular application is not compatible with the mobile device.

Figure 3B:
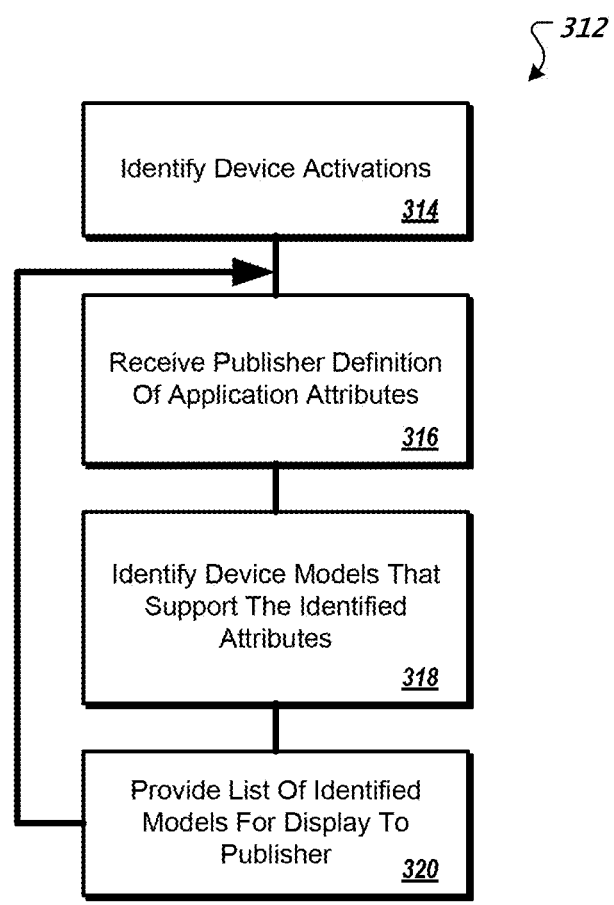

Referring now to FIG. 3B, an example process 312 is shown for determining an appropriate device configuration for compatibility checking, as performed by a server application to process a request from a remote computing device for a list of compatible applications. In some implementations, the process 312 may be performed by the software application marketplace system 200 of FIG. 2.

At step 314, the server application identifies or otherwise acquires a plurality of data that represents a number of activated (i.e., enabled) computing devices registered with the server application. In general, the activated computing devices may be organized in a hierarchical manner, such as by manufacturer, and then device type. In one example, this may further include the server application maintaining an up-to-date listing of activated devices, as well populating the listing with information related to recent activations of devices of particular and/or similar types.

At step 316, the server application receives an application requirement definition for at least one computer application that is to be made available at an online marketplace associated with the server application. In one example, this may include a user interacting with the publisher client 228 such as described above in connection with FIG. 2.

At step 318, the server application identifies numbers of computing devices whose corresponding device capability information indicates an ability of the devices to properly execute the applications, according to the application requirement definition(s) acquired at step 316. In one example, the identification of types and/or quantities of computing devices is additionally based on the data as acquired at step 314. In another example, the identification of types and/or quantities of computing devices is further additionally based on numbers of downloads of applications from the online marketplace. In this example the server application identifies downloads of applications from the online marketplace and associates the respective downloads with device types.

At step 320, the server application presents, on the remote computing device, an indication of how many devices will be potentially capable of executing the computer application under the received application requirement definition. In general, the types and/or quantities of devices may be presented in a variety of manners, and can represent an approximation rather than an exact number. In some implementations, the server application additionally presents information as to what types of devices are compatible with a particular computer application. Such a metric may beneficially enable a developer or publisher to identify both the scope and type of the associated market.

In some implementations, operational flow within the example process 300 returns to step 316 following step 320. This may occur, for example, as a manual "on-demand" process, or as part of an automated periodic or intermittent process. In this example, the server application may receive a subsequent application requirement definition for the mobile application as specified at step 316, and then may provide updated information to the remote computing device to indicate how many devices will be capable of executing the mobile application under the revised application requirement definition. Such information may further provide a publisher or a developer with recurring information as to those devices that are incompatible with a particular mobile application. This may enable the publisher or developer to strategically dedicate resources to supporting users whose devices are compatible with the application, as opposed to supporting users whose devices are incompatible with the application, Additionally, this may prevent unfavorable user reviews from being published to an online product listing, forum, or other information repository associated with a particular device and/or the application marketplace by users who may have inadvertently downloaded an application that is incompatible with their device.

Figure 4A:
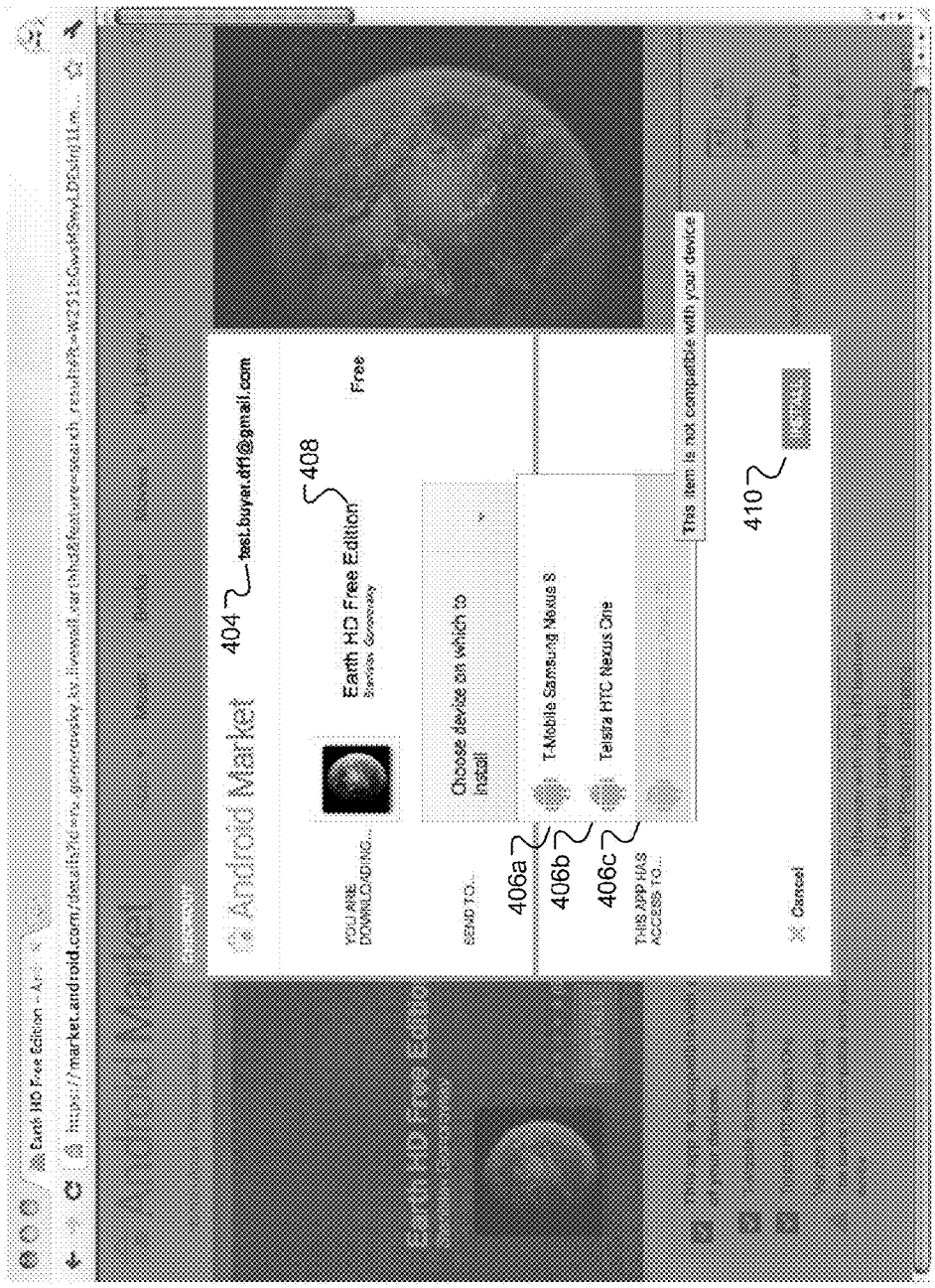
FIGS. 4A-4D show interfaces that illustrate example conventional user and publisher interactions with an application marketplace.
Figure 4B:
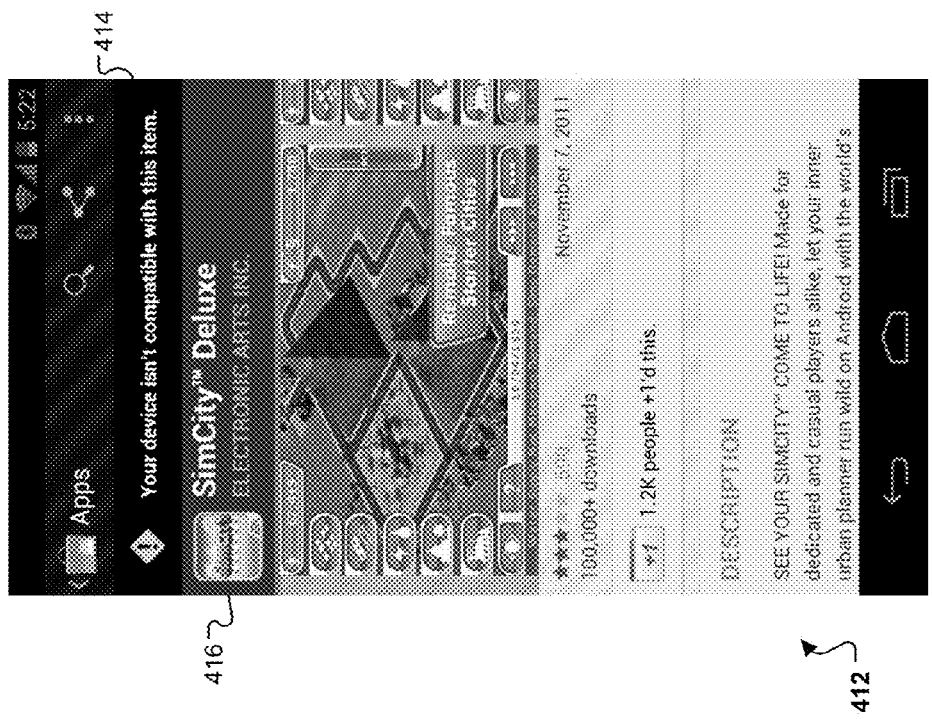

Referring now to FIGS. 4A and 4B, first and second example interfaces are shown with which a conventional user may interact when accessing functionality of an application marketplace (e.g., marketplace 108). Specifically, FIG. 4A shows an example market website 402. The website 402 illustrates an interface with which a user may interact in accordance with a scenario similar to example "use case" (b) described above, in which a user 404 may have multiple devices 406a-c associated with that particular user's account. In this example, a mobile application 408 is shown to be incompatible with device 406c (e.g., device 406c is "grayed-out"), whereas devices 406a-b are identified as compatible with the mobile application 408. The user may subsequently have the mobile application 408 "pushed" to either or both of the devices 404a-b as desired via selection of an install button 410.

FIG. 4B shows an example market client 412. The client 412 illustrates an interface with which a user may interact in a scenario similar to Example Scenario B as described above. For example, the client 412 may surface a notification 414 that informs a user that a mobile application 416 is incompatible (e.g., "Your device isn't compatible with this item.") with a mobile device (not shown) currently being used by the user to interact with the market client 412.

Figure 4C:
Figure 4D:
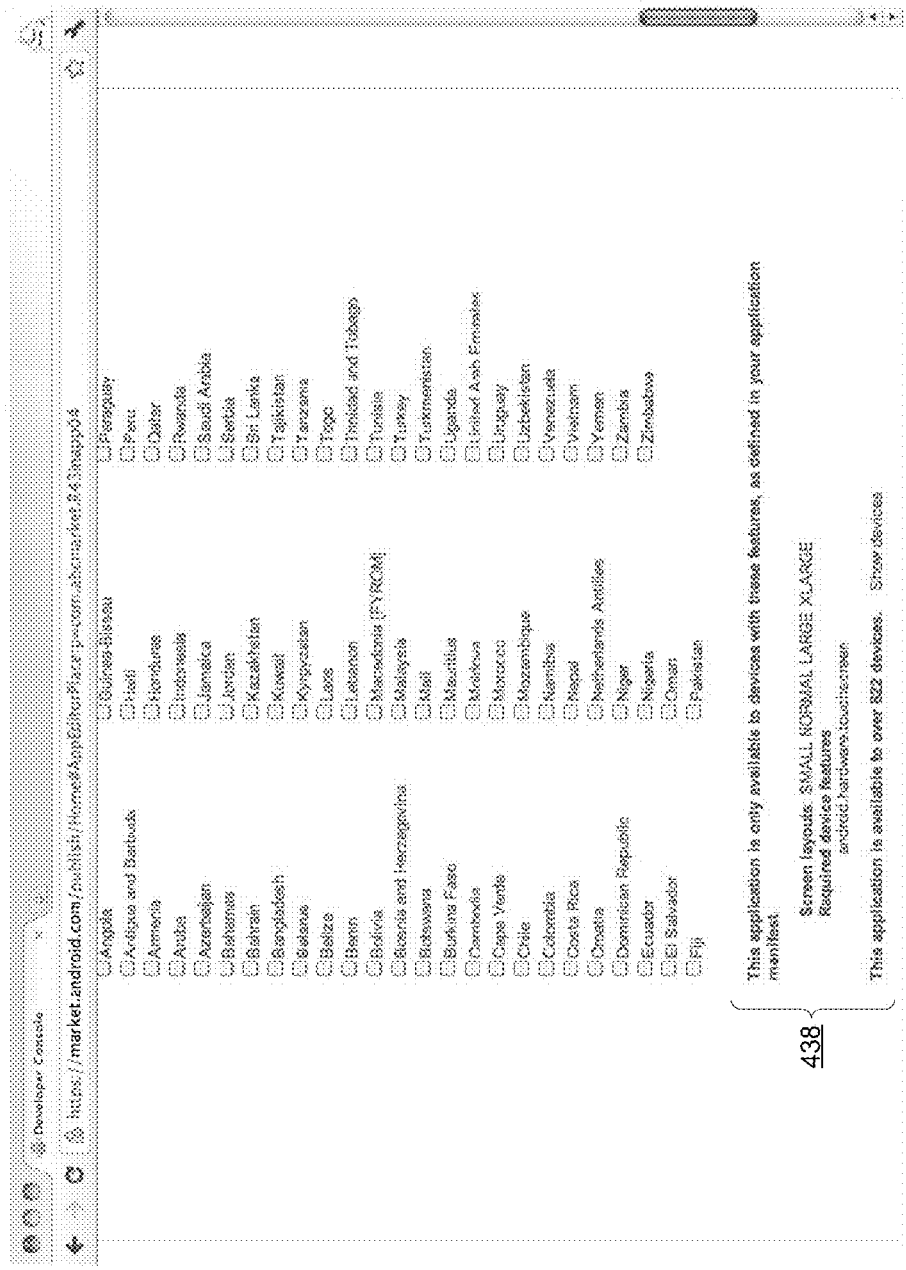

Referring now to FIGS. 4C and 4D, first and second example interfaces are shown with which a publisher may interact when accessing functionality of an application marketplace (e.g., marketplace 108). Specifically, FIG. 4C shows a first publisher interface 418 that includes a first pane 420, a second pane 422, and a third pane 424. The first pane 420 includes a listing 426 of mobile devices (e.g., "822 devices") that are compatible with a given mobile application (not shown) that was previously selected by a publisher over the course of navigating to the interface 418. In general, the listing 424 may be populated with devices specific to a particular manufacturer (e.g., by entering OEM information within a text field 428 and selecting a search button 430), or be populated with all devices known or otherwise registered with the application marketplace (e.g., by omitting entry within the text field 428 and selecting a show-all button 432).

The second pane 422 may be populated with one or more devices that are manually excluded by a publisher for being potentially being incompatible with the given mobile application mentioned above. For example, an exclude selection 434 associated with a particular one of the mobile devices within the first pane 420 (e.g., "Galaxy S (GT-19003)") may be selected to designate that particular mobile device type as being incompatible with the mobile application. In contrast, the third pane 424 may be populated with one or more device types that are automatically excluded for being incompatible with the given mobile application based on a setting or parameters defined with a manifest (e.g., configuration report 122). With respect to both the second pane 422 and the third pane 424, a user who owns a mobile device specified within the second pane 422 or third pane 424 may ultimately be prevented from downloading a potentially incompatible mobile application in a manner such as described above in connection with FIGS. 1-3.

FIG. 4D shows a second publisher interface 436 that is similar to the first publisher interface 418. However, in this example, the second publisher interface 436 includes a section 438 that provides a number of mobile devices (e.g., "822 devices") that are compatible with a given mobile application (not shown) selected by the publisher over the course of navigating to the interface 436, along with a description as to the feature(s) required by those devices to support the mobile application, the mobile application and device otherwise being designated as incompatible.

Although not shown in this figure, the number of available devices, which is shown here actually as a number of available device types, may be supplemented with a number of available physical devices—e.g., the total number of telephones or tablets in operation in the country, world, or other region defined by the publisher in bringing up the numbers. As discussed above, such numbers may be computed by identifying the number of activations of devices for each device type in certain defined periods (e.g., each of the previous X weeks, months, or quarters). The activation numbers may then be adjusted to better reflect the number of devices of each type that are likely to access the marketplace. For example, historical data may reflect that a certain percentage of a certain model of device or style of device accesses the marketplace and buys applications after activation. For example, more powerful and expensive smartphones may have a higher "conversion" rate for purchasing applications than do less expensive smartphones. Also, the numbers may be adjusted to reflect demand over time, such as by lessening demand by users the longer after activation they get. In addition, seasonal variations may be taken into account, and the publisher may select to identify if their application is of a type that has seasonal variations so that such observed prior seasonal variations may be applied (e.g., if the application is a game that relates to elves). Finally, estimates of the total number of actual physical devices that will be available to access the application may be displayed on the display 436, and each time a publisher makes a change to parameters that are demanded by the application, the number may be updated.

Figure 5:
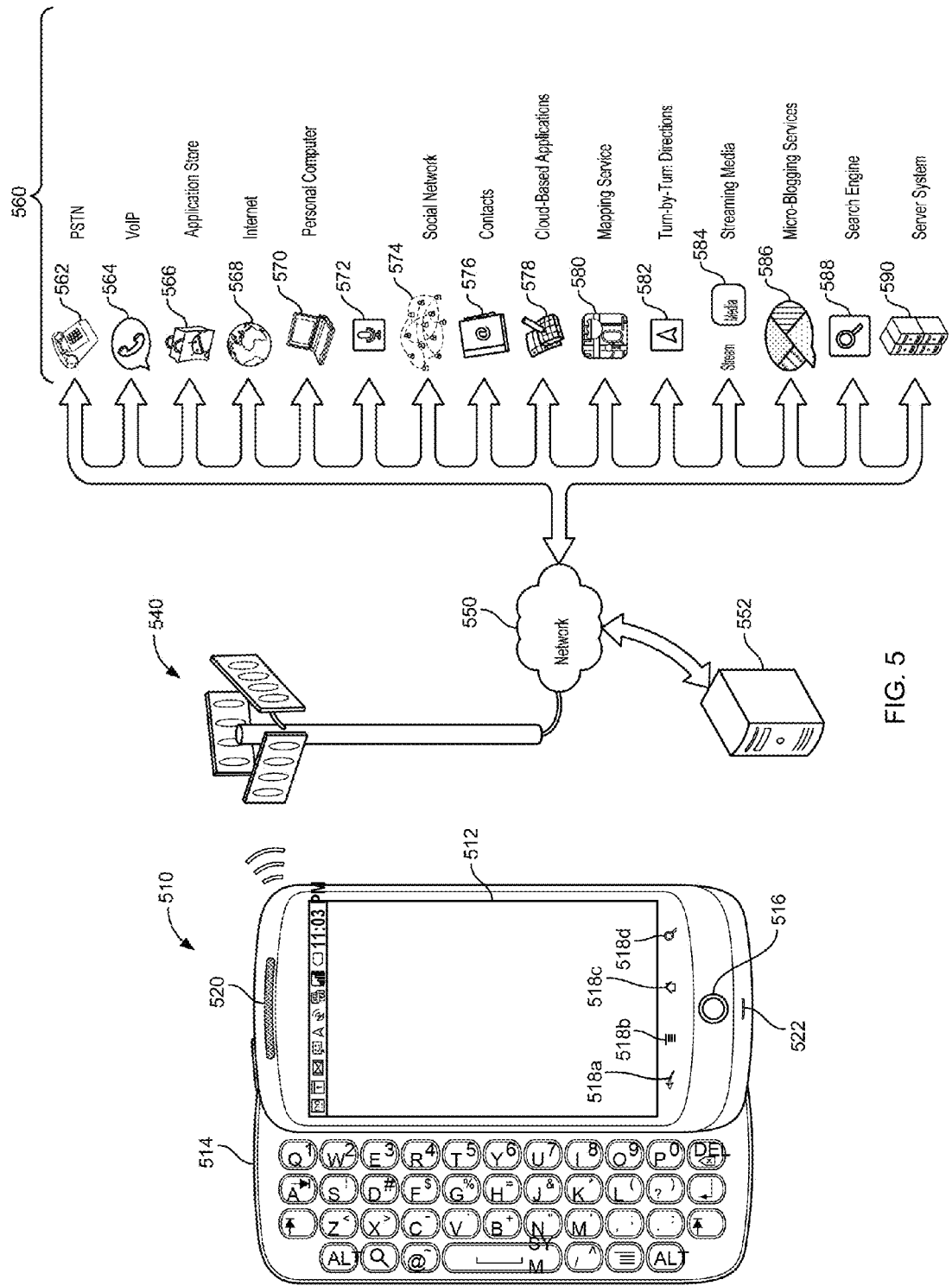
FIG. 5 shows a conceptual diagram of a system that may be used to implement the systems and methods described in this document.

Referring now to FIG. 5, a conceptual diagram of a system that may be used to implement the systems and methods described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or an application telephone) that includes a touchscreen display device 512 for presenting content to a user of the mobile computing device 510 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 514, physical buttons, trackballs, accelerometers, gyroscopes, and magnetometers).

Example visual output mechanism in the form of display device 512 may take the form of a display with resistive or capacitive touch capabilities. The display device may be for displaying video, graphics, images, and text, and for coordinating user touch input locations with the location of displayed information so that the device 510 can associate user contact at a location of a displayed item with the item. The mobile computing device 510 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full "qwerty" keyboard or a traditional keypad that includes keys for the digits "0-9" and "*" and "#." The keyboard 514 receives input when a user physically contacts or depresses a keyboard key. User manipulation of a trackball 516 or interaction with a track pad enables the user to supply directional and rate of movement information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME OS, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" graphical user interface that is displayed after turning on the mobile computing device 510, after activating the mobile computing device 510 from a sleep state, after "unlocking" the mobile computing device 510, or after receiving user-selection of the "home" button 518c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 510 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, Internet access point IP location determinations, inferential identification of a user's position based on search engine queries, and user-supplied identification of location (e.g., by receiving user a "check in" to a location).

The mobile computing device 510 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 510. The mobile device 510 may include a digital camera sensor, and corresponding image and video capture and editing software. An Internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., ETHERNET, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computing systems that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing systems associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call using a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the Internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the Internet 568 through network 550. For example, a user of the mobile computing device 510 may invoke a web browser application that requests data from remote computing devices that are accessible at designated universal resource locations. In various examples, some of the services 560 are accessible over the Internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of Internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

In accordance with the present disclosure "determining" by a computing system can include the computing system requesting that another device perform the determination and supply the results to the computing system. Moreover, "displaying" or "presenting" by a computing system can include the computing system sending data for causing another device to display or present the referenced information.

Figure 6:
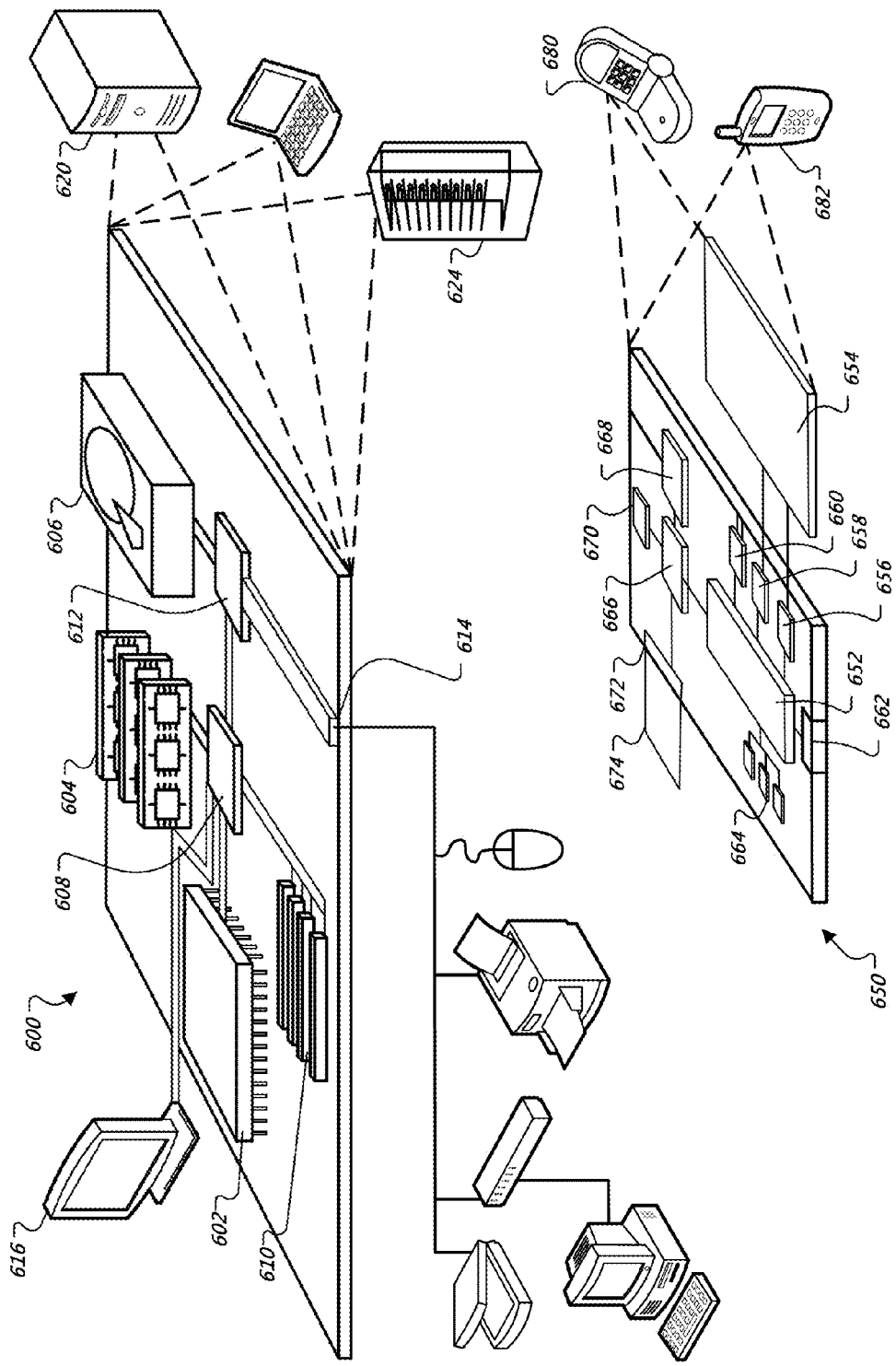
FIG. 6 shows an example of a computer device and a mobile computer device that can be used to implement the techniques described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device, such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

The processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. The external interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

The device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional navigation- and location-related wireless data to device 650, which may be used as appropriate by applications running on device 650.

The device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. Since it is not possible to store information in a transient data signal, "machine-readable medium" and "computer-readable medium" excludes transient signals.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
identifying, at a computer server system, first capability information for a computing device, the first capability information being provided by the computing device;
comparing the received first device capability information to a library of device capability information stored at the server system;
identifying an entry in the library that corresponds to the first device capability information;
generating a second device capability information using the entry, wherein the second device capability information reflects capabilities of the computing device that were not reported by the computing device and includes one or more fields from the entry;
identifying a subset of applications in an application marketplace accessible to the computing device;
subsequent to identifying the subset of applications in the application marketplace, comparing the second device capability information to application requirements that define device characteristics required or preferred for one or more of the subset of applications; and
providing, for presentation by the computing device, one or more representations of applications filtered by the comparing of the second device capability information to the application requirements.

2. The method of claim 1, wherein the first capability information is transmitted as a plurality of explicit device capabilities for particular features that are part of the computing device.

3. The method of claim 2, wherein the device features comprise memory size, processor power, sensor availability, display size, keyboard availability, camera availability, camera resolution, and operating system version.

4. The method of claim 1, wherein the library of device capability information stored at the server system is defined by one of: manual entry; automatic identification of common device configurations from an aggregation of uploaded device configurations; and manual entry with cross-checking based on automated aggregation and alerts to an operator in event of discrepancy.

5. The method of claim 1, wherein identifying the entry in the library that corresponds to the first device capability information comprises comparing, with the first device capability information, at least one of a device model identifier, a software framework version number, and a build identification number associated with the computing device.

6. The method of claim 1, wherein the second device capability information is formed entirely from the entry, and excludes the first device capability information.

7. The method of claim 1, wherein the second device capability information includes one or more fields received from the computing device.

8. The method of claim 1, wherein identifying a subset of applications comprises identifying that the user is viewing a page for a particular application, and providing the representations of applications filtered by the comparing comprises providing an indication, for display on the page, as to whether the application is compatible with one of the computing device and a device other than the computing device.

9. A computer-implemented server system comprising:
a server front end arranged to interact with a plurality of computing devices seeking to obtain information about applications in an online application marketplace;
a device capability library that stores information that indicates technical capabilities of a plurality of different devices that are programmed to execute applications from the application marketplace, wherein some of the devices are not capable of properly executing some of the applications; and
a marketplace manager programmed to:
compare received first device capability information to the device capability library;
identify an entry in the device capability library that corresponds to the first device capability information;
generate second device capability information using the entry, wherein the second device capability information includes one or more fields from the entry and one or more fields received from the particular computing device;
identify a subset of applications in the application marketplace;
subsequent to identifying the subset of applications in the application marketplace, compare the second device capability information to application requirements that define device characteristics required or preferred for one or more applications in an online application marketplace that is accessible to the particular computing device; and
provide a representation of one or more applications filtered by the comparing the second device capability information to the application requirements.

10. The system of claim 9, wherein the device capability information received from the particular computing device comprises a plurality of explicit device capabilities identifiers for particular technical features that are part of the particular computing device.

11. The system of claim 10, wherein the technical features are selected from the group consisting of memory size, processor power, sensor availability, display size, keyboard availability, camera availability, camera resolution, and operating system version.

12. The system of claim 9, wherein the second device capability information includes one or more fields received from the computing device.

13. The system of claim 9, wherein identifying the subset of applications comprises identifying that the user is viewing a page for a particular application, and providing the representations of applications filtered by the comparing comprises providing an indication, for display on the page, an indication whether the application is compatible with the computing device.

14. The system of claim 9, the marketplace manager further programmed to provide, for presentation by the particular computing device, one or more representations of applications filtered by the comparing of the second device capability information to the device requirements.

* * * * *